Figure 1:
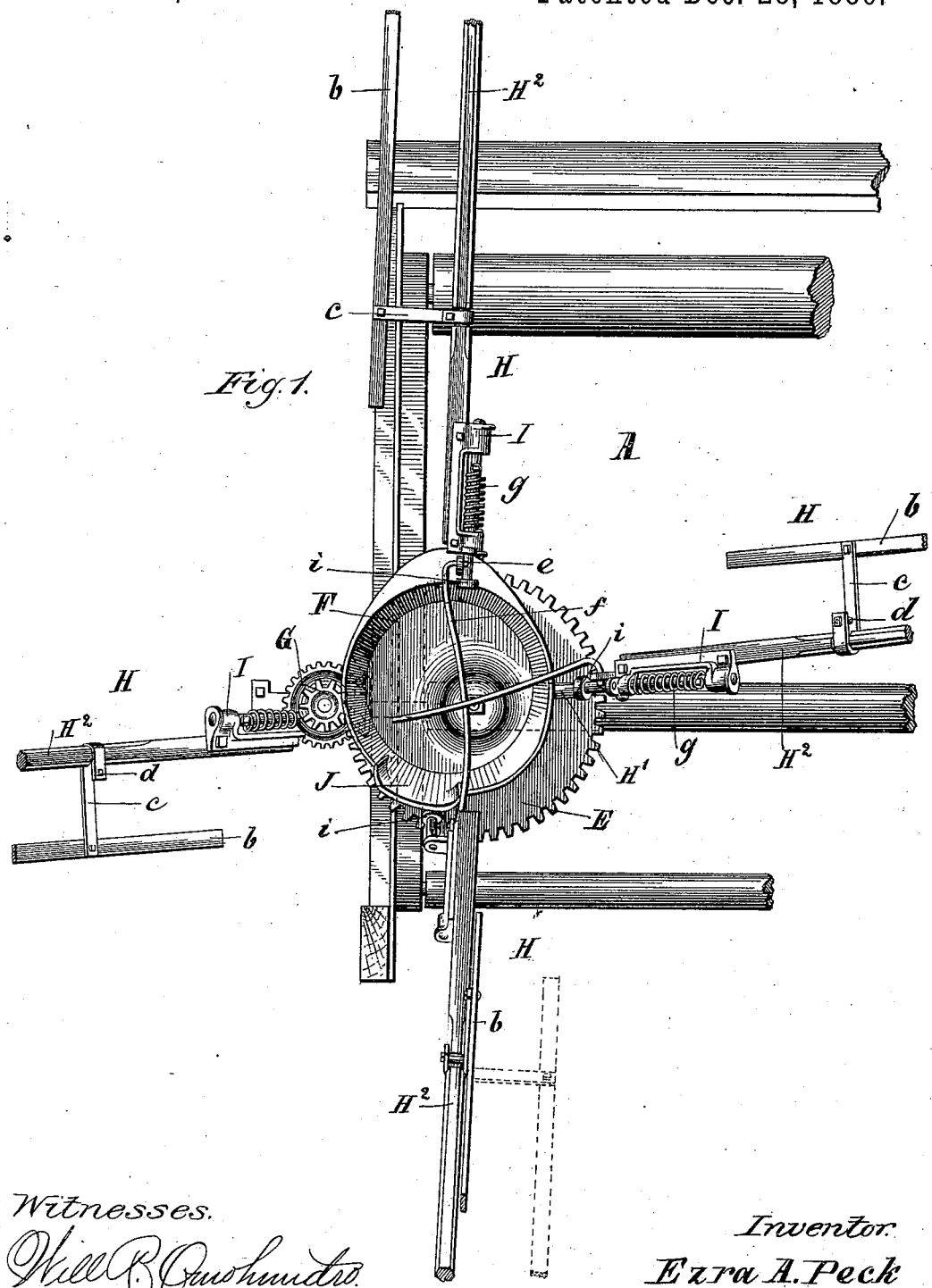

(No Model.)  4 Sheets—Sheet 1.

E. A. PECK.
HARVESTER REEL.

No. 355,202.  Patented Dec. 28, 1886.

Witnesses.  
Will R. Cushmedro.  
Otto Th. Nyberg.

Inventor.  
Ezra A. Peck  
By Coburn & Thacher  
Atty's (No Model.) 4 Sheets—Sheet 2.
E. A. PECK.
HARVESTER REEL.
No. 355,202. Patented Dec. 28, 1886.
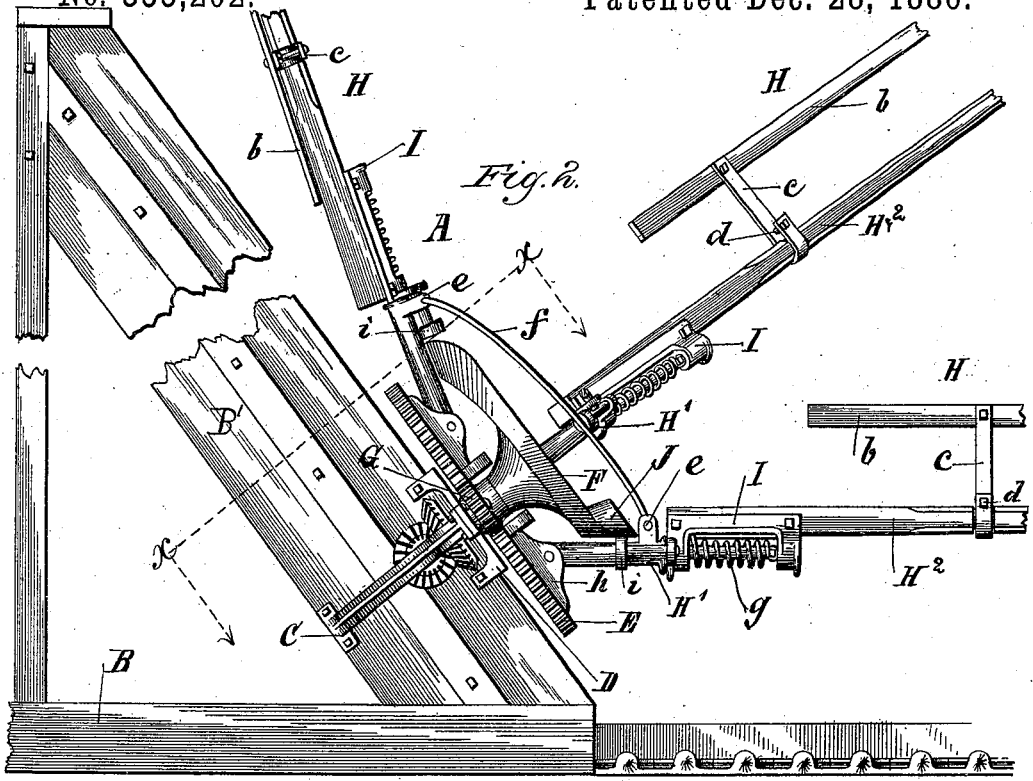
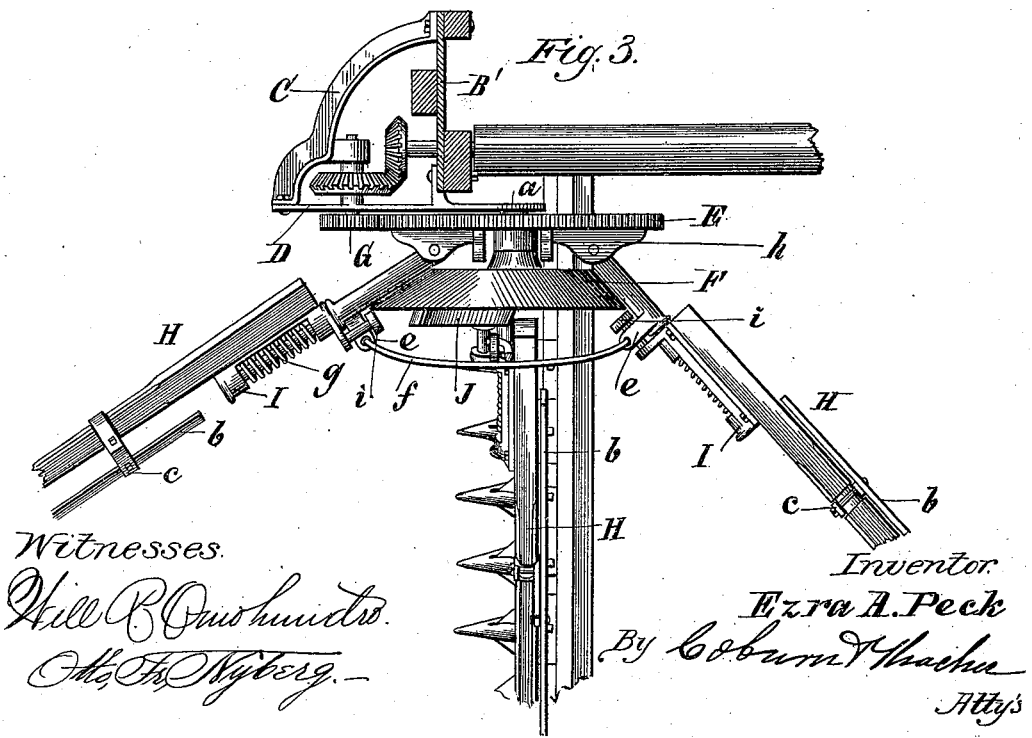
Witnesses. Inventor.
Ezra A. Peck
By Coburn & Thacher
Attys

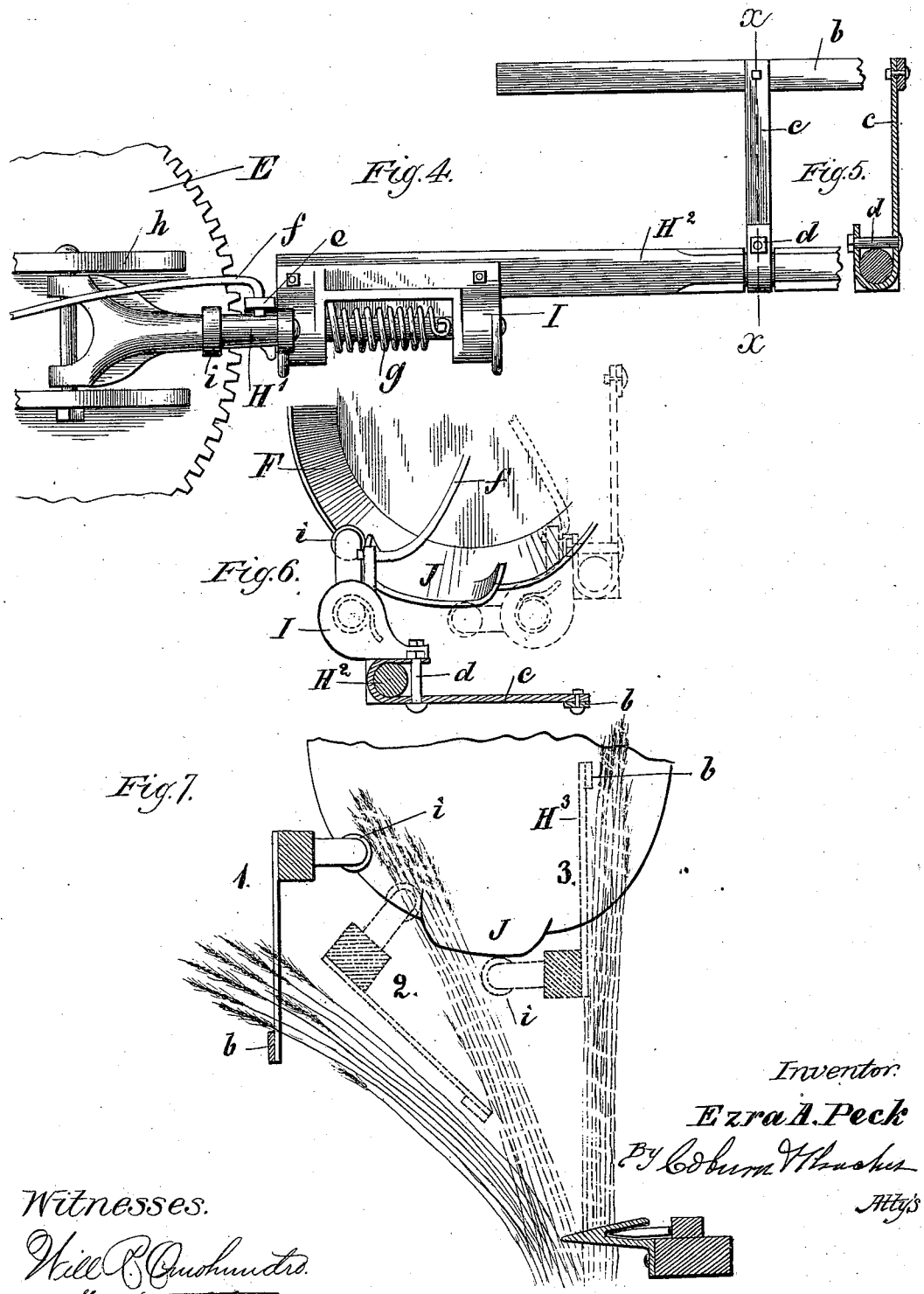

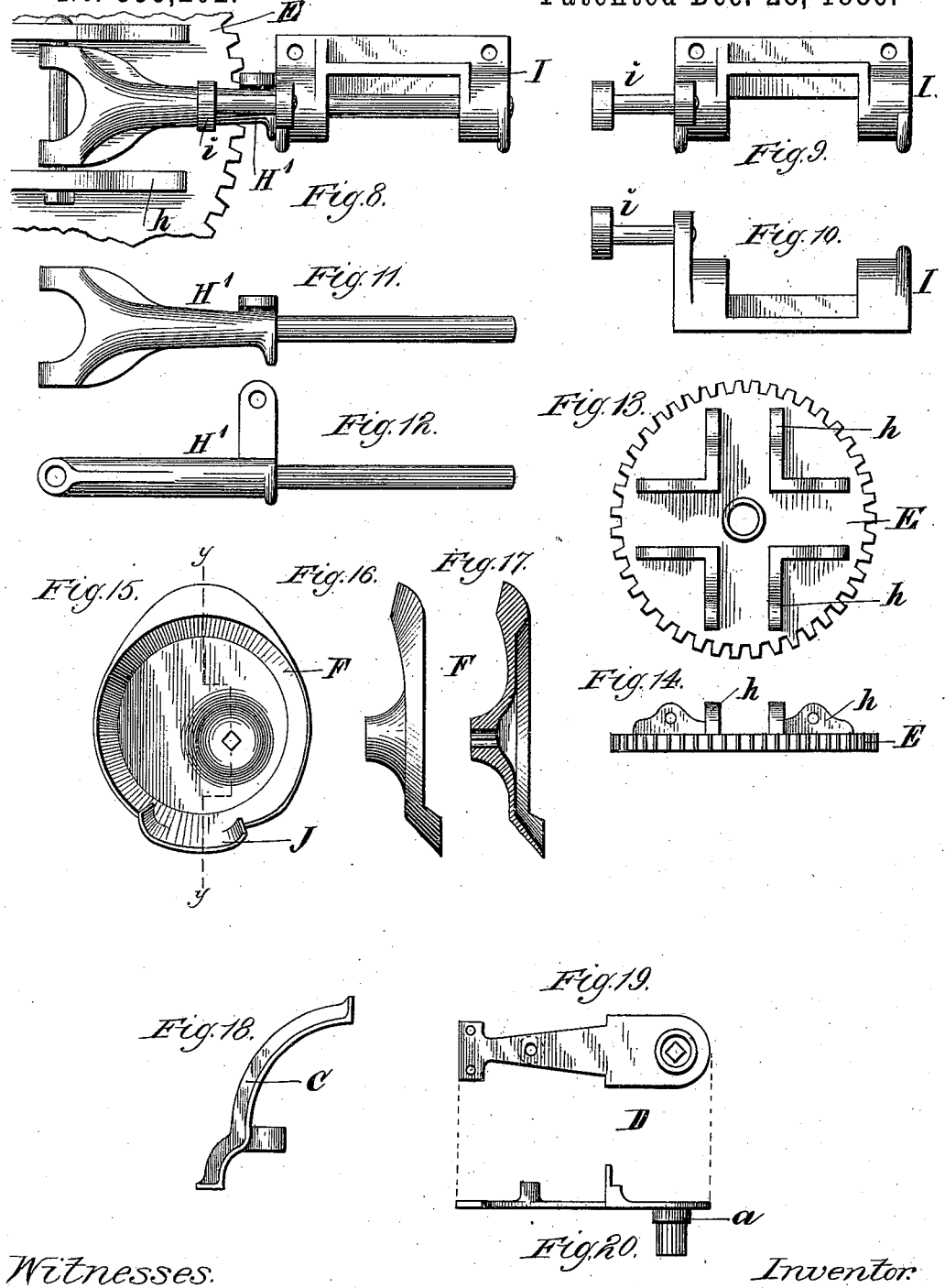

UNITED STATES PATENT OFFICE.

EZRA A. PECK, OF PLANO, ILLINOIS, ASSIGNOR TO THE PLANO MANUFACTURING COMPANY, OF SAME PLACE.

HARVESTER-REEL.

SPECIFICATION forming part of Letters Patent No. 355,202, dated December 28, 1886.

Application filed May 27, 1885. Serial No. 166,878. (No model.)

*To all whom it may concern:*

Be it known that I, EZRA A. PECK, a citizen of the United States, and residing at Plano, in the county of Kendall and State of Illinois, have invented a certain new and useful Improvement in Harvester-Reels, which is fully set forth in the following specification, reference being had to the accompanying drawings, in which—

Figure 1 is a plan of my improved harvester-reel, looking from a point in line with the reel-axis; Fig. 2, a side elevation of the same, shown in connection with the A-frame, to which it is attached, and by which it is supported; Fig. 3, a sectional plan view of the reel from the line $x\,x$, Fig. 2, showing part of the grain-cutting mechanism; Fig. 4, a plan view of a part of the wheel to which the reel-arms are attached, and of the inner end of one of the reel-arms and reel-bats; Fig. 5, a sectional view taken on the line $x\,x$, Fig. 4, showing the manner of attaching the reel-bats to the reel-arm. Figs. 6 and 7 are detail views, showing the different positions assumed by one of the reel-bats in the operation of my improved harvester-reel. Figs. 8 to 20, inclusive, are details of the reel-arms and mode of their attachment to the wheel by which the reel is operated, and of the wheel and the stationary cam.

My improvements relate to harvesters for harvesting grain, in which the grain is automatically elevated preparatory to being delivered to the binder, and is designed to overcome the difficulties arising from the grain being blown down and tangled from the effect of the wind or other causes; and it is designed, by means of the mechanisms which I will hereinafter fully describe, to raise the grain that has been so pushed down or flattened, and retain it in a uniform standing position, so that the cutting mechanism may cut the straw at a point desirably near to the roots.

I will now proceed to describe my invention more in detail, reference being had to the drawings, in all the figures of which like parts are represented by the same letters, and I will then point out definitely in the claims what I believe to be new and wish to secure by letters patent.

A is the harvester-reel, taken as a unit. B is the main or platform frame, and B' the elevator-frame, and attached to the latter is the bracket C. This bracket is shown in detail, Fig. 18. Attached to the bracket C, by proper bolts, is the bracket D, a plan and elevation of which are shown in Figs. 19 and 20. This bracket D is furnished with a hollow stud-pin, $a$, which forms a support or journal for the wheel E, carrying the reel-arms, and to which is also attached rigidly, by means of a proper bolt, the cam F. The reel-carrying wheel E is operated by a pinion, G.

As my invention relates particularly to the reel, I shall confine my description to that part of the machine, it being taken for granted that the remaining portions of the machine are of the usual construction.

My reel-arms H are four in number, and are provided with bats $b$, which are attached to the arms by means of the links $c$. These links are of the form shown in detail in Fig. 5. One end of the link is bolted directly to the bat. The other end is bent into a U shape, and by means of holes drilled at proper points and the bolt $d$ the bat may be rigidly attached at any desired angle to the axial plane of the reel-arm.

The reel arm is composed of two members, which, for the sake of convenience, I will designate as the "primary" and "secondary" arms H' and H². The primary arm, or the one which is attached to the wheel which operates the reel, is provided with a lug, $e$, by means of which two antipodal reel-arms are connected by means of the link $f$, (each arm being provided with a lug.) Attached to the secondary reel-arm H² is a bracket-bearing, which is shown in detail in Figs. 8, 9, and 10, (the primary arm being shown in detail in Figs. 11 and 12,) and in this bracket-bearing the shank of the primary arm is loosely fitted, the outer end being upset, or any proper device used to maintain the two members in proper relation to one another. Attached to the shank of the primary arm at one end, and the other end bearing against the side of the bracket-bearing I, is the coil-spring $g$. This spring is constructed and arranged to hold the bats in normal position with reference to the primary arms H', when free from any other influence, and to return them to such position when they have been turned out therefrom by the action of the cam. The normal position of the link c and reel-bats is about at right angles to the plane of the arm-wheel when the reel-arms are radial thereto, and the springs hold them in this position unless overcome by some other force.

In making the arm-bearing wheel there are cast upon its upper surface suitable bearings for the bolts by which the primary arms are attached to the wheel, and the angular elevation of the arms is regulated by the length of the link $f$ and cam F. This arm-bearing wheel is shown in Figs. 13 and 14, where also are seen the bearing-brackets $h$. Attached to the bracket-bearing I is the friction-roller $i$, which is arranged so that it will engage with a projection, J, on the cam F, to turn the bats, as will be hereinafter described. This cam F is so constructed and held in place that it is eccentric to the arm-bearing wheel E, and the object of the eccentricity is to throw the arm farther out into the grain, ahead of the cutter, and also to raise up the arm and turn it on its hinge upward toward the wheel after the bat has laid the grain upon the platform and is thrown upward into the position numbered 3 in Fig. 7 of the drawings. This is while the reel is being carried around through the inoperative portion of its path, and obviously the turning up of the arm toward the wheel brings its outer end nearer to the axis of the latter, thereby very much shortening the radius of its orbit movement. The outer end of the reel-arm, and, in fact, the entire outer portion of the said arm and bat, will therefore travel more slowly during this portion of its movement than when it is thrown down and outward to its fullest extent. This cam F is furnished on its lower side with a projection, J. When in the course of their revolutions the arms H have come into the position where they begin to pick up the grain, it is desirable that they should go at their minimum rate of speed, while it is also desirable that the angle of their axial plane in relation to the vertical axis of the arm-carrying wheel should be rapidly changed. To effect this the friction-rollers $i$ and the projection J on the lower side of the cam have been provided. As shown in Fig. 7 of the drawings, the friction-roller $i$, coming in engagement with the forward curve of the projection J, the bat is rapidly thrown forward and rapidly brought into the position shown at $H^3$ in Fig. 7, which position, having been attained by the bat and secondary arm, is continued until the friction-roller passes along to the rear curve of the projection J, when the spring $g$ comes into play, and the obstruction of the projection being passed, the secondary arm regains its normal position with reference to the primary arm and the arm-carrying wheel. The primary arms engage loosely, though frictionally, with the flanged periphery of the cam, and, being connected by the links F, it is impossible for them to drop, as would be their natural tendency. The length of the link is simply sufficient to draw the arms up into loose contact with the cam.

In the operation of the reel described above, when the reel-arm descends into the grain in front of the cutting apparatus, the bat stands in nearly a vertical plane, as shown at 1 in Fig. 7 of the drawings. Then, as it moves backward, it is turned backward, also as shown at 2 in the same figure, by which movement the bat slips down under the grain and lifts it up, and when the reel is acted upon by the projecting portion J of the cam the bat is turned backward and up into the position shown at 3 in the same figure, thereby straightening up the grain to the fullest extent possible when it reaches the cutters. The reel is released from the projection of the cam just after the grain is cut, and the spring, coming into operation, the bat is thrown down into a practically-horizontal position, which will tend to lay the grain flat and in proper position on the platform.

I must call attention to the fact that the device to which my improvements relate is strictly a reel, none of the bats being provided with teeth for use as a rake, and the arrangement and movement of the arms being such that they cannot possibly be used as rakes for discharging the grain from the platform. The reel is intended for use in connection with the usual elevating devices now so well known in grain-harvesters, the platform being provided with one carrier and the elevator-frame being provided with another, by means of which the grain delivered on the platform is carried to the binder.

It is generally desirable that the axis of the reel should be at an angle to the elevator-frame of the harvester, so that the reel would, in fact, be inclined. This is essential in using the reel shown in the drawings of this application; but the reel might be made jointed and set out from the frame at such a distance that it would be perpendicular in its axis to the line of the sickle-bar.

I do not wish to be understood as limiting my invention to details of construction and arrangement precisely as herein shown and described, as many mechanical changes may be made without departing from the controlling ideas of the invention.

Having thus described my invention, what I claim as new, and desire to secure by Letters Patent, is—

1. In a grain-harvester, the main or platform frame, in combination with the elevator-frame, a series of reel-arms jointed to a revolving head set in a plane inclined to the platform, links connecting the reel-arms in pairs, and a stationary cam which controls the rising and falling movements of the reels, substantially as and for the purposes set forth.

2. In a harvester, the main or platform frame to which the cutting apparatus is attached, in combination with the inclined revolving head, the reel-arms jointed to said head, and the cam F, shaped substantially as shown, whereby the reel-bats are brought into the grain in nearly a vertical plane, are then turned backward as they move to the rear, until finally they are turned up so as to stand above the arms a little before the grain reaches the cutter, substantially as and for the purposes set forth.

3. In a harvester, the main platform-frame, in combination with the head or wheel E, revolving in a plane inclined to the platform, the reel-arms H, linked together in pairs, and consisting of the two parts H' H², the springs $g$ for turning the reel-bats down, the cam F, shaped as described, and provided with a projection, J, on its lower side, and projections or cranks connected to the arms H² of the reel, and arranged to run in contact with the projection J of the cam, substantially as and for the purposes set forth.

4. In a grain-harvester, the platform-frame carrying the cutting apparatus, in combination with the inclined reel-head, the reel-arms jointed to said head and composed of two parts, one turning upon the other, and a cam constructed and arranged to act on the reel-arms, whereby the bats descend into the grain in front of the cutters in a nearly vertical plane, are then turned upward as they are carried to the rear slightly, and then turned into a vertical plane above the bars just before the grain is severed, and then thrown down to the rear just after the grain is cut, substantially as and for the purposes set forth.

5. In a harvester-reel, the combination, with the wheel E and cam F, of the primary arm H', the secondary arm H², bracket I, spring $g$, and reel-bats connected with the reel-arm by a metallic strap U-shaped at the inner end, substantially as and for the purposes set forth.

EZRA A. PECK.

Witnesses:
W. H. JONES,
LEONARD WATSON.